(12) United States Patent
Kanai et al.

(10) Patent No.: US 12,554,858 B2
(45) Date of Patent: Feb. 17, 2026

(54) RISK EVALUATION DEVICE, RISK EVALUATION METHOD, AND PROGRAM PRODUCT

(71) Applicant: KABUSHIKI KAISHA TOSHIBA, Tokyo (JP)

(72) Inventors: Jun Kanai, Inagi Tokyo (JP); Tatsuya Uehara, Kawasaki Kanagawa (JP); Ryuiti Koike, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 573 days.

(21) Appl. No.: 18/173,870

(22) Filed: Feb. 24, 2023

(65) Prior Publication Data

US 2024/0012910 A1 Jan. 11, 2024

(30) Foreign Application Priority Data

Jul. 6, 2022 (JP) .................................. 2022-108737

(51) Int. Cl.
G06F 21/57 (2013.01)

(52) U.S. Cl.
CPC .................................. G06F 21/577 (2013.01)

(58) Field of Classification Search
CPC .................................................. G06F 21/577
See application file for complete search history.

(56) References Cited

U.S. PATENT DOCUMENTS

| 2019/0020674 A1 | 1/2019 | Vervier et al. |
| 2020/0162497 A1 | 5/2020 | Iyer et al. |
| 2020/0226266 A1* | 7/2020 | Fukami .................. G06F 21/577 |

(Continued)

FOREIGN PATENT DOCUMENTS

| JP | 2016-91402 A | 5/2016 |
| JP | 2020-4006 A | 1/2020 |

(Continued)

OTHER PUBLICATIONS

Japan Patent Office, Office Action in JP App. No. 2022-108737 (May 27, 2025).

*Primary Examiner* — Normin Abedin
(74) *Attorney, Agent, or Firm* — Finnegan, Henderson, Farabow, Garrett & Dunner, LLP

(57) ABSTRACT

According to one embodiment, a risk evaluation device includes a vulnerability information input unit, an individual countermeasure acquisition unit, a parameter acquisition unit, a determination unit, and a calculation unit. The vulnerability information input unit receives an input of vulnerability information to be subjected to risk evaluation. The individual countermeasure acquisition unit acquires at least one security countermeasure introduced into a system to be evaluated. The parameter acquisition unit acquires a candidate parameter value to be used for calculation of the risk of vulnerability for each security countermeasure based on the security countermeasure and the vulnerability information. The determination unit determines a parameter to be used for the calculation of the risk of vulnerability from the candidate parameter values. The calculation unit calculates a risk value indicating the risk of vulnerability by using the parameters determined by the determination unit.

15 Claims, 11 Drawing Sheets

(56) References Cited

U.S. PATENT DOCUMENTS

| | | |
|---|---|---|
| 2021/0034757 A1 | 2/2021 | Boulton et al. |
| 2021/0288989 A1 | 9/2021 | Kanai et al. |
| 2022/0083694 A1 | 3/2022 | Kamei |
| 2022/0121739 A1* | 4/2022 | Kawauchi ............... G06F 21/55 |
| 2022/0179966 A1 | 6/2022 | Shinke et al. |
| 2023/0252132 A1 | 8/2023 | Kanai |
| 2023/0334159 A1 | 10/2023 | Shin et al. |
| 2024/0281540 A1* | 8/2024 | Mizushima ........... G06F 21/577 |

FOREIGN PATENT DOCUMENTS

| | | |
|---|---|---|
| JP | 2020-21309 A | 2/2020 |
| JP | 2020-525960 A | 8/2020 |
| JP | 2021-144268 A | 9/2021 |
| JP | 2022-47160 A | 3/2022 |
| JP | 2022-89573 A | 6/2022 |
| JP | 2023-115443 A | 8/2023 |
| JP | 2023-154864 A | 10/2023 |
| WO | WO 2021/130897 A1 | 7/2021 |
| WO | WO 2022/059146 A1 | 3/2022 |
| WO | WO 2022/137403 A1 | 6/2022 |

* cited by examiner

FIG.2

| SECURITY COUNTERMEASURE NAME | PRODUCT NAME |
|---|---|
| FIREWALL | PRODUCT A |
| IPS (INTRUSION PREVENTION SYSTEM) | - |
| ROOM ENTRY AND EXIT MANAGEMENT | PRODUCT D |
| PERMISSION LIST TYPE EXECUTION CONTROL | PRODUCT B |
| ⋮ | ⋮ |

FIG.3

| SECURITY COUNTERMEASURE NAME | CWE | PARAMETER CONDITION |
|---|---|---|
| FIREWALL | CWE-XX | if AV=N then MAV=L<br>If C=H or C=L then MC=N |
| | CWE-XY | ... |
| IPS (INTRUSION PREVENTION SYSTEM) | CWE-XX | if AV=N then MAV=L<br>If C=H then MC=L |
| | CWE-XZ | ... |
| ROOM ENTRY AND EXIT MANAGEMENT | CWE-XZ | ... |
| PERMISSION LIST TYPE EXECUTION CONTROL | CWE-YY | MAC=H<br>MPR=H |
| ⋮ | ⋮ | ⋮ |

FIG.4A

| CVE NUMBER | PRODUCT A | PRODUCT B | PRODUCT C |
|---|---|---|---|
| CVE-XXXXX1 | ○ | | |
| CVE-XXXXX2 | | ○ | |
| CVE-XXXXX3 | ○ | ○ | |
| CVE-XXXXX4 | | ○ | ○ |
| CVE-XXXXX5 | ○ | | |
| CVE-XXXXX6 | | ○ | ○ |
| ⋮ | ⋮ | ⋮ | ⋮ |

FIG.4B

| CVE NUMBER | PRODUCT A | PRODUCT B | PRODUCT C |
|---|---|---|---|
| CVE-XXXXX1 | if AV=N then MAV=L | | |
| CVE-XXXXX2 | | MPR=H | |
| CVE-XXXXX3 | if AV=N then MAV=L | MPR=H | |
| CVE-XXXXX4 | | MPR=H<br>MA=L | if AV=N then MAV=L |
| CVE-XXXXX5 | if AV=N then MAV=L<br>MC=L | | |
| CVE-XXXXX6 | | MPR=H | if AV=N then MAV=L |
| ⋮ | ⋮ | ⋮ | ⋮ |

FIG.7

| RULE NUMBER | ADJUSTMENT RULE |
|---|---|
| 1 | IF OPERATION TIME OF PROCESS HAVING VULNERABILITY IS 10% OR LESS, LOWER AR/CR/IR BY ONE STAGE, AND IF OPERATION TIME OF PROCESS HAVING VULNERABILITY IS 0%, LOWER AR/CR/IR BY TWO STAGES |
| 2 | IF LIBRARY HAVING VULNERABILITY IS NOT LINKED FROM ANOTHER PROCESS, LOWER AR/CR/IR BY TWO STAGES |
| 3 | IF LIBRARY HAVING VULNERABILITY IS NOT LINKED FROM PROCESS FOR PROVIDING SERVICE TO OUTSIDE, LOWER AR/CR/IR BY ONE STAGE |
| ⋮ | ⋮ |

FIG.8

| SECURITY COUNTERMEASURE NAME | INFLUENCE ON NETWORK LATENCY | INFLUENCE ON COMPUTER LOAD | INFLUENCE ON AVAILABILITY DUE TO FALSE DETECTIONS |
|---|---|---|---|
| FIREWALL | YES | NO | NO |
| IPS (INTRUSION PREVENTION SYSTEM) | NO | NO | NO |
| ROOM ENTRY AND EXIT MANAGEMENT | NO | NO | NO |
| PERMISSION LIST TYPE EXECUTION CONTROL | NO | YES | NO |
| REJECTION LIST TYPE EXECUTION CONTROL | NO | YES | YES |
| ⋮ | ⋮ | ⋮ | ⋮ |

RISK EVALUATION DEVICE, RISK EVALUATION METHOD, AND PROGRAM PRODUCT

CROSS-REFERENCE TO RELATED APPLICATIONS

This application is based upon and claims the benefit of priority from Japanese Patent Application No. 2022-108737, filed on Jul. 6, 2022; the entire contents of which are incorporated herein by reference.

FIELD

Embodiments described herein relate generally to a risk evaluation device, a risk evaluation method, and a program.

BACKGROUND

Security vulnerabilities are reported on a daily basis, for which there is a common vulnerability scoring system (CVSS) by the Forum of Incident Response and Security Teams (FIRST) in the United States as a technology for grasping vulnerability risks. For example, a technique is known by which necessity of countermeasures against vulnerability is determined based on the calculation result of an environmental value and a current value of CVSS, and necessity of countermeasures is determined based on an attack path and the presence or absence of security countermeasures on the path.

However, by the related art, it has been difficult to enable calculating a risk value based on an introduced security countermeasure with higher accuracy.

BRIEF DESCRIPTION OF THE DRAWINGS

FIG. 2 is a diagram illustrating an example of an introduced security countermeasure DB according to the first embodiment;

FIG. 3 is a diagram illustrating an example of a mitigation countermeasure DB according to the first embodiment;

FIG. 4A is a diagram illustrating Example 1 of a product vulnerability handling DB according to the first embodiment;

FIG. 4B is a diagram illustrating Example 2 of the product vulnerability handling DB according to the first embodiment;

FIG. 7 is a diagram illustrating an example of an adjustment rule according to the second embodiment;

FIG. 8 is a diagram illustrating an example of a security countermeasure DB according to the second embodiment;

DETAILED DESCRIPTION

A risk evaluation device according to an embodiment includes one or more hardware processors configured to function as a vulnerability information input unit, an individual countermeasure acquisition unit, a parameter acquisition unit, a determination unit, and a calculation unit. The vulnerability information input unit is configured to receive an input of vulnerability information to be subjected to risk evaluation. The individual countermeasure acquisition unit is configured to acquire at least one security countermeasure introduced into a system to be evaluated. The parameter acquisition unit is configured to acquire a candidate parameter value to be used for calculation of a risk of vulnerability for each of security countermeasures based on the security countermeasure and the vulnerability information. The determination unit is configured to determine a parameter to be used for the calculation of the risk of vulnerability from candidate parameter values. The calculation unit is configured to calculate a risk value indicating the risk of vulnerability by using the parameter determined by the determination unit.

Hereinafter, embodiments of a risk evaluation device, a risk evaluation method, and a program are described in detail with reference to the accompanying drawings.

First Embodiment

In vulnerability handling, a basic value of CVSS, that is, a characteristic of vulnerability itself is regarded as a risk, but actually, the risk changes according to each environment such as a security requirement, a system configuration, and an introduced security countermeasure. That is, there is a possibility of an excessive countermeasure being taken or a countermeasure against a serious risk not being taken by using the basic value.

When the vulnerability is found, it tends to be interpreted that a patch needs to be applied, but other countermeasures may be considered depending on the risk. For example, a countermeasure (hereinafter, it is referred to as a "mitigation countermeasure") is taken by changing the FW setting. However, a method of calculating a risk value according to whether or not a mitigation countermeasure is introduced is not established. That is, it is not possible to know how much the risk is reduced by the mitigation countermeasures, and it is difficult to determine whether to introduce an additional countermeasure.

Therefore, in the risk evaluation device according to the first embodiment, a risk value (for example, the environmental value of CVSS v3) based on an introduced security countermeasure can be calculated with high accuracy, and a risk according to a system to be evaluated can be quantitatively grasped. In addition, the risk evaluation device according to the first embodiment automatically recommends a mitigation countermeasure and also enables quantitative grasp of a risk reduction effect at the time of introduction, so that vulnerability handling is appropriately and easily performed.

Example of Functional Configuration

Figure 1:
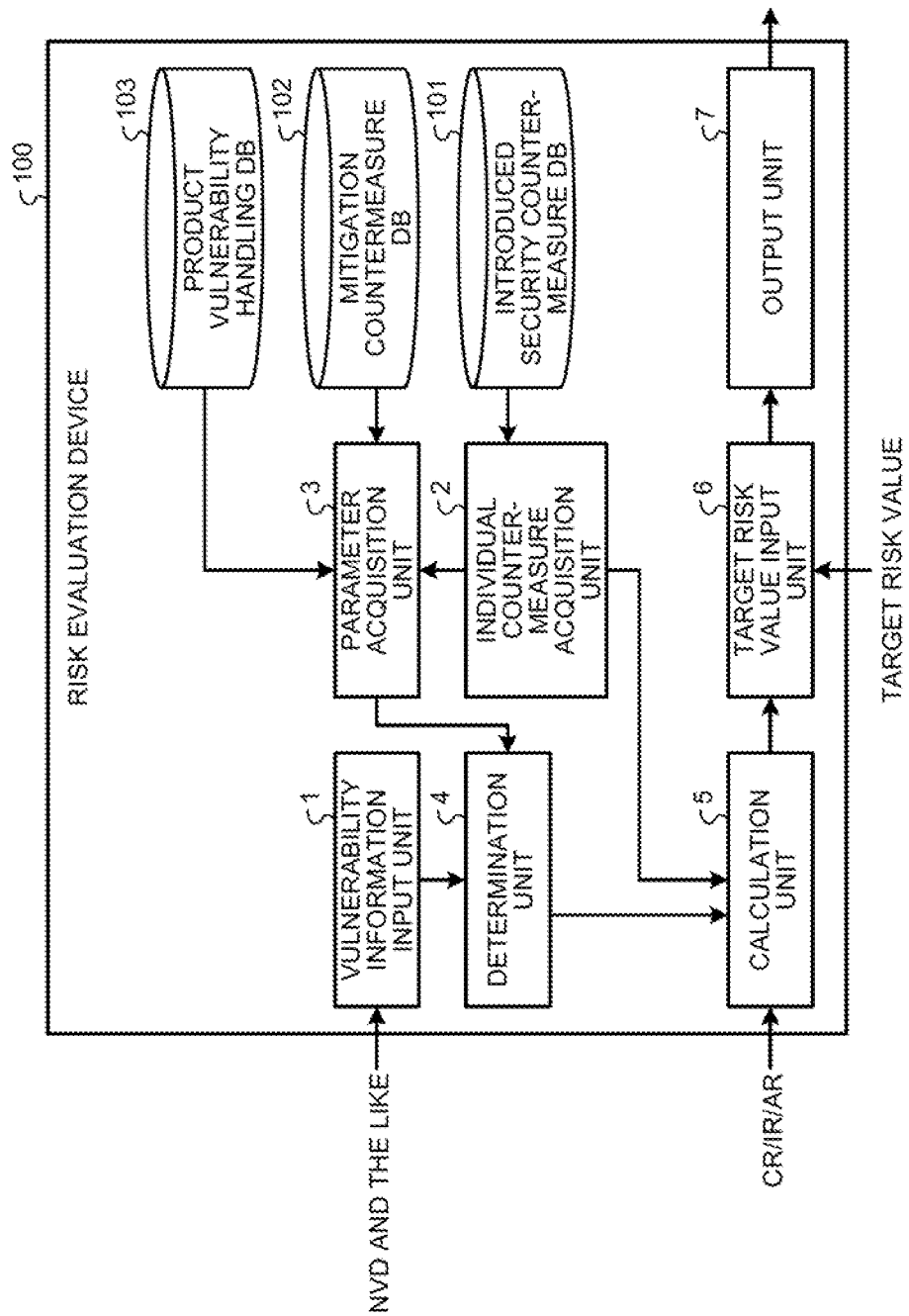
FIG. 1 is a diagram illustrating an example of a functional configuration of a risk evaluation device according to a first embodiment.

FIG. 1 is a diagram illustrating an example of a functional configuration of a risk evaluation device 100 according to a first embodiment. The risk evaluation device 100 according to the first embodiment includes a vulnerability information input unit 1, an individual countermeasure acquisition unit 2, a parameter acquisition unit 3, a determination unit 4, a calculation unit 5, a target risk value input unit 6, and an output unit 7. In addition, the risk evaluation device 100 according to the first embodiment stores an introduced security countermeasure DB 101, a mitigation countermeasure DB 102, and a product vulnerability handling DB 103. Note that the introduced security countermeasure DB 101, the mitigation countermeasure DB 102, and the product vulnerability handling DB 103 may be stored in a storage unit inside the risk evaluation device 100 or may be stored in a server device or the like outside the risk evaluation device 100.

The vulnerability information input unit 1 receives an input of information relating to the vulnerability of the risk determination target and passes the corresponding information to the determination unit 4. The vulnerability information described herein is, for example, information of Common Vulnerabilities and Exposures (CVE) provided by National Vulnerability Database (NVD), Japan Vulnerability Notes (JVN), and the like.

The CVE includes a basic value calculated by a basic evaluation criterion of a common vulnerability scoring system (CVSS) and various parameters for calculating the basic value.

The basic value is used to calculate a risk of vulnerability together with target software and hardware of vulnerability, description, and Common Weakness Enumeration (CWE) indicating a type of vulnerability.

Various parameters for calculating basic values may include vectors defined by CVSS, that is, attack source classification (AV: Attack vector), attack condition complexity (AC: access complexity), and the like. Hereinafter, a case where the parameters defined in CVSS version 3 are included in the various parameters for calculating basic values is described.

The individual countermeasure acquisition unit 2 acquires the introduced security countermeasure (for example, a security countermeasure list) introduced in the target system from the introduced security countermeasure DB 101.

FIG. 2 is a diagram illustrating an example of the introduced security countermeasure DB 101 according to the first embodiment. In the example of FIG. 2, an introduced security countermeasure list is stored in tabular format where a security countermeasure name (type) and a specific product name are included. For the individual countermeasure acquisition unit 2, a method of acquiring the introduced security countermeasure list from the introduced security countermeasure DB illustrated in the example of FIG. 2 is the simplest method, but the individual countermeasure acquisition unit 2 may take a method of automatically scanning the system to be evaluated to identify the introduced countermeasure.

FIG. 3 is a diagram illustrating an example of the mitigation countermeasure DB 102 according to the first embodiment. The mitigation countermeasure DB 102 of the first embodiment includes a security countermeasure name, CWE, and a parameter condition. In the example of FIG. 3, the parameter condition is stored for each combination of the security countermeasure name and the CWE.

Returning to FIG. 1, the parameter acquisition unit 3 refers to the mitigation countermeasure DB 102 and acquires an environmental value calculation vector (a candidate parameter value to be used for calculation of a risk of vulnerability) based on the name of the introduced security countermeasure and the specific product name. For example, it is assumed that the CWE assigned to the vulnerability of the risk determination target is CWE-XX, the basic value calculation vectors are AV=N (A indicates an attack source classification, and N indicates a network) and C=H (C indicates a possibility of information leakage, and H indicates high), and the type of the introduced security product acquired by the individual countermeasure acquisition unit 2 is a firewall.

At this time, the parameter acquisition unit 3 refers to the mitigation countermeasure DB in FIG. 3 and specifies that parameter conditions are Expressions (1) and (2).

$$\text{if } AV=N \text{ then } MAV=L \qquad \text{Expression (1)}$$

$$\text{if } C=H \text{ or } C=L, \text{ then } MC=N \qquad \text{Expression (2)}$$

Then, the parameter acquisition unit 3 applies AV=N and C=H to Expressions (1) and (2) to obtain environmental value calculation vectors of MAV=L and MC=L. As described above, the parameter acquisition unit 3 acquires the environmental value calculation vectors for the plurality of security countermeasures. For example, when both a firewall and an intrusion prevention system (IPS) are introduced as security countermeasures, the parameter acquisition unit 3 acquires MAV=L and MC=L from the parameter condition of the firewall and acquires MAV=L and MC=L from the parameter condition of the IPS.

In the above example, the parameter acquisition unit 3 acquires the environmental value calculation vector by using the CWE and the type of the product, but, depending on the security product, there is a product of which the handleable vulnerability is disclosed as data. When the type of vulnerability that is handleable by the security product can be acquired for each security product introduced into the system to be evaluated, the parameter acquisition unit 3 acquires a candidate parameter value further based on the type of vulnerability. For example, the parameter acquisition unit 3 may acquire the environmental value calculation vector by using the product vulnerability handling DB 103.

FIG. 4A is a diagram illustrating Example 1 of a product vulnerability handling DB 103 according to the first embodiment. In Example 1 of FIG. 4A, the product vulnerability handling DB 103 includes handleability of each product for each vulnerability (CVE) number. For example, in the example of FIG. 4A, in an environment where a product having a product name of Product A is introduced, the vulnerability risk of CVE-XXXXX1 is handleable.

FIG. 4B is a diagram illustrating Example 2 of a product vulnerability handling DB 103 according to the first embodiment. In Example 2 of FIG. 4B, the parameter condition of each product is included for each vulnerability (CVE) number.

Specifically, the parameter acquisition unit 3 has a method of acquiring an environmental value calculation parameter from the mitigation countermeasure DB 102 (FIG. 3) and Example 1 (FIG. 4A) of the product vulnerability handling DB 103 based on the product name acquired by the individual countermeasure acquisition unit 2 and a method of calculating an environmental value calculation parameter from Example 2 (FIG. 4B) of the product vulnerability handling DB 103.

In the former case, the parameter acquisition unit 3 first specifies the number of the vulnerability (CVE) to be subjected to risk evaluation from the product name of the security countermeasure and Example 1 of the product vulnerability handling DB 103 in FIG. 4A. Then, the parameter acquisition unit 3 acquires an environmental value calculation vector from a combination of the number of the specified vulnerability (CVE) and the countermeasure name of the security countermeasure by the product specified by the product name, with reference to the introduced security countermeasure DB 101 (FIG. 2).

For example, when the risk of CVE-XXXXX1 is evaluated in an environment where a product having a product name of Product A is introduced, in Example 1 (FIG. 4A) of the product vulnerability handling DB 103, "○" is assigned to Product A, and the vulnerability risk of CVE-XXXXX1 is handleable. Therefore, the parameter acquisition unit 3 acquires the environmental value calculation vector from the combination of the CWE specified from CVE-XXXXX1 and the security countermeasure name of the product A with reference to the mitigation countermeasure DB 102 (FIG. 2). On the other hand, when evaluating the risk of CVE-XXXXX2, the parameter acquisition unit 3 determines that the product A cannot handle the risk of CVE-XXXXX2 because "○" is not assigned to the product A in Example 1 of the product vulnerability handling DB 103 (FIG. 4A).

In addition, when calculating the environmental value calculation parameter from Example 2 of the product vulnerability handling DB 103 (FIG. 4B), the parameter acquisition unit 3 refers to the parameter condition in the column of the intersection between the product name of the security countermeasure and the number of the vulnerability (CVE) to be subjected to risk evaluation and acquires the environmental value calculation vector. For example, when the risk of CVE-XXXXX2 is evaluated in an environment where a product B is adopted, the parameter acquisition unit 3 acquires an environmental value calculation vector of Expression (3).

$$MPR=H \qquad \text{Expression (3)}$$

Referring back to FIG. 1, when receiving one or more environmental value calculation vectors (a group of parameters (vectors)) from the parameter acquisition unit 3, the determination unit 4 determines an environmental value calculation vector to be used for calculation of an environmental evaluation criterion defined by CVSS from the one or more environmental value calculation vectors.

In the example of the introduced security countermeasure DB 101 of FIG. 2, the operation of the determination unit 4 of the first embodiment is described using a system in which a firewall and an IPS are introduced as an example. In a mitigation countermeasure of vulnerability when the CWE is CWE-XX, and the environmental value calculation vector is C=H and AV=N, if a firewall is introduced, the environmental value calculation vector is MAV=L, MC=N, and the like. On the other hand, when IPS is introduced, MAV=L and MC=L. When both are introduced, MAV is both L, and thus MAV=L becomes the environmental value calculation vector, but MC is determined differently between N and L. At this time, the determination unit 4 selects one having a lower risk. That is, in this example, the determination unit 4 determines MC=N as the environmental value calculation vector.

The calculation unit 5 calculates the environmental value by using the environmental value calculation vector determined by the determination unit 4 and the environmental evaluation criteria. The calculation unit 5 uses the calculation method specified in CVSS but calculates the environmental value as "unevaluated" for a vector for which the environmental value calculation vector is not set.

Further, the calculation unit 5 may further receive an input of the security requirement degree of the system to be evaluated and calculate environmental values (risk value and risk score) based on the security requirement degree. For example, the calculation unit 5 may receive an input of a vector (CR/IR/AR) relating to the security requirement degree defined by CVSS and reflect the input of the vector (CR/IR/AR) to the environmental value calculation, by calculation of the environmental value higher according to the input or the like.

The target risk value input unit 6 receives an input of a risk value as a target (hereinafter referred to as a "target risk value"), receives the environmental value from the calculation unit 5, compares the target risk value with the environmental value, and determines an environmental value to be output based on a comparison result.

For example, the target risk value is a numerical value input for the purpose of making the environmental value (risk score) of the CVSS a certain value or less by security countermeasures. In this case, the target risk value input unit 6 sets an environmental value higher than the target risk value as an output target, so that the user can grasp the necessity of security countermeasures against vulnerability according to the target risk value.

In addition, for example, in CVSS, the classification of severity is defined in the forms of urgency (risk score of 9.0 to 10.0), importance (risk score of 7.0 to 8.9), and warning (risk score of 4.0 to 6.9), and thus, a value indicating the classification may be used as the target risk value. For example, when the classification of the warning is input, the target risk value input unit 6 sets the environmental value of the classification higher than the warning (risk score higher than 6.9) as the output target.

When not receiving the input of the target risk value, for example, the target risk value input unit 6 may set all the environmental values input from the calculation unit 5 as output targets.

The output unit 7 outputs output information indicating the risk of vulnerability. For example, the output unit 7 outputs output information including the environmental value determined to be the output target by the target risk value input unit 6. Specifically, the output unit outputs output information including vulnerability information (for example, information including identification information of a vulnerability and an environmental value of the vulnerability) relating to the environmental value to be output.

In addition, the output format of the output information by the output unit 7 may be any format. For example, the output information may be display information for the display device, data in a computer-readable file format, or an e-mail addressed to the user. Various methods can be considered as the output format of the output information by the output unit 7, but an appropriate method may be selected according to the requirement.

Example of Risk Evaluation Method

Figure 5:
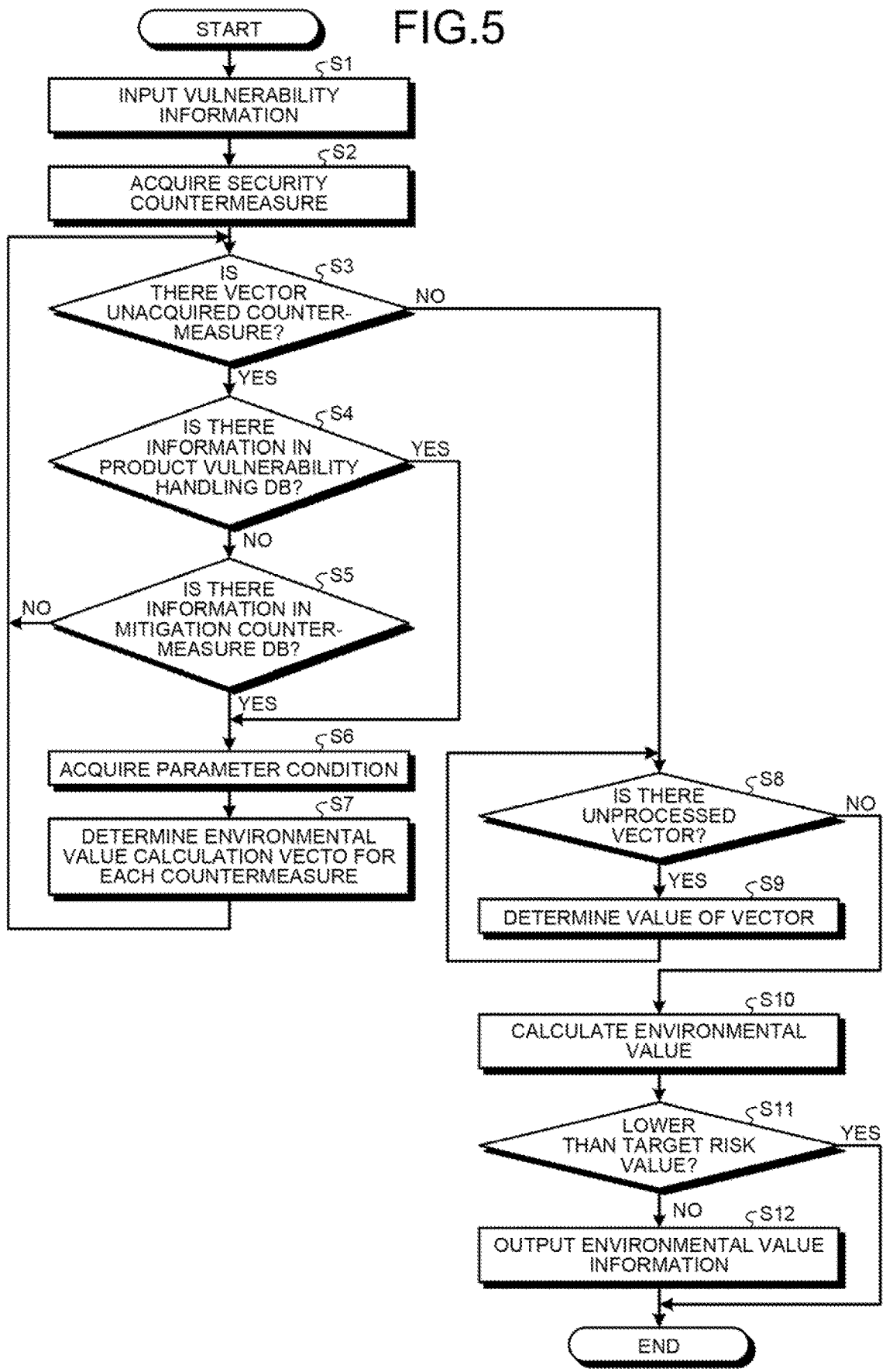
FIG. 5 is a flowchart illustrating an example of a risk evaluation method according to the first embodiment.

FIG. 5 is a flowchart illustrating an example of the risk evaluation method according to the first embodiment. First, when the vulnerability information input unit 1 receives an input of vulnerability information (for example, information of CVE) (Step S1), the individual countermeasure acquisition unit 2 acquires a security countermeasure introduced into a system to be subjected to risk evaluation from the introduced security countermeasure DB 101 (Step S2). For example, the security countermeasure list as illustrated in FIG. 2 is acquired by the process in Step S2.

Subsequently, the risk evaluation device 100 calculates an environmental value calculation vector for each security countermeasure. Here, a method of determining a vector using the product vulnerability handling DB 103 (FIG. 4A or 4B) and the mitigation countermeasure DB 102 (FIG. 3) is described.

When acquisition of the vectors is not completed for all the security countermeasures (Step S3, Yes), the parameter acquisition unit 3 first determines whether there is information in the product vulnerability handling DB 103 (Step S4). Specifically, the parameter acquisition unit 3 determines whether the parameter condition can be acquired from the product name of the product to be used as the security countermeasure and the CVE number corresponding to the type of vulnerability (CWE) handled by the security countermeasure to be processed as in the product vulnerability handling DB 103 in FIG. 4B.

If the product vulnerability handling DB 103 includes information (Step S4, Yes), the parameter acquisition unit 3 acquires parameter conditions from the product vulnerability handling DB 103 (Step S6).

If the product vulnerability handling DB 103 does not include information (Step S4, No), the parameter acquisition unit 3 determines whether there is information in the mitigation countermeasure DB 102 (Step S5). Specifically, the parameter acquisition unit 3 determines whether the parameter condition can be acquired from a combination of the security countermeasure name of the introduced product and the CWE number of the vulnerability.

When there is not information in the mitigation countermeasure DB 102 (Step S5, No), the process returns to Step S3. When the mitigation countermeasure DB 102 includes information (Step S5, Yes), the parameter acquisition unit 3 acquires a parameter condition from the mitigation countermeasure DB 102 (Step S6).

Note that all the processes of Steps S4 and S5 are processes for acquiring the parameter condition, but the process of step S4 is not essential in the example of the flowchart of FIG. 5.

Next, the parameter acquisition unit 3 determines an environmental value calculation vector for each security countermeasure from the parameter condition obtained by the process in Step S6 and the basic value calculation vector of the CVE (Step S7).

When the acquisition of the vectors is completed for all the security countermeasures by the parameter acquisition unit 3, that is, when there is no security countermeasure for which the environmental value calculation vector is not acquired (Step S3, No), the determination unit 4 determines whether there is an unprocessed vector (Step S8). For example, there are a plurality of vectors such as MAV, MAC, MC, MI, and MA as environmental value calculation vectors, but the determination unit 4 checks whether there is an unprocessed vector among the plurality of vectors.

When there is an unprocessed vector (Step S8, Yes), the determination unit 4 determines the value of the environmental value calculation vector, for example, by a value having the lowest risk among the values of the unprocessed vectors (Step S9). When the determination is made on the safe side, the determination unit 4 may determine a value having the highest risk as the value of the environmental value calculation vector or may determine the median value among the values of the unprocessed vectors as the value of the environmental value calculation vector.

The determination unit 4 repeats the process of Step S9 for each vector, and when there is no unprocessed vector (Step S8, No), the calculation unit 5 calculates the environmental value by using the vector (CR/IR/AR) relating to the security requirement degree and the value of the vector determined by the determination unit 4 (Step S10).

Next, the target risk value input unit 6 checks whether the environmental value calculated by the process in Step S10 is lower than the target risk value input by the user (Step S11). When the environmental value is equal to or larger than the target risk value input by the user (Step S11, No), the output unit 7 outputs output information including the environmental value (Step S12). For example, the output information includes information of CVE, a value of an environmental value, and the like.

When the environmental value is lower than the target risk value input by the user (Step S11, Yes), the process ends. Even when the environmental value is lower than the target risk value input by the user (Step S11, Yes), the output unit 7 may output the output information indicating that the environmental value is lower than the target risk value for each piece of CVE information.

As described above, in the risk evaluation device 100 according to the first embodiment, the vulnerability information input unit 1 receives input of vulnerability information to be subjected to risk evaluation. The individual countermeasure acquisition unit 2 acquires at least one security countermeasure introduced into the system to be evaluated. The parameter acquisition unit 3 acquires a candidate parameter value to be used for calculation of the risk of vulnerability for each security countermeasure based on the security countermeasure and the vulnerability information (for example, CVE). The determination unit determines a parameter to be used for the calculation of the risk of vulnerability from the candidate parameter values. Then, the calculation unit 5 calculates a risk value indicating the risk of vulnerability by using the parameters determined by the determination unit 4.

With the risk evaluation device 100 of the first embodiment, the risk value (for example, the environmental value of CVSS v3) based on the introduced security countermeasures can be calculated with higher accuracy. As a result, the user can quantitatively grasp the risk corresponding to the security countermeasure introduced in the system to be evaluated.

Second Embodiment

Next, a second embodiment is described. In the description of the second embodiment, the description similar to that of the first embodiment is omitted, and portions different from those of the first embodiment are described.

According to the first embodiment described above, the risk value (the environmental value of CVSS v3) can be calculated with high accuracy by the introduced security countermeasure. On the other hand, since the vulnerability information and the risk value are output, it is not clear how to handle the risk. In addition, the security requirement degree such as CR/IR/AR varies depending on the method of using a module having a vulnerability in the system, but it is difficult for the user to grasp the method of using the module. Furthermore, since a device is installed on a network depending on a security countermeasure, there is a case where it is invalid depending on an attack source.

In the second embodiment, in view of these problems, an embodiment is described in which the effectiveness of the countermeasure, the method of using the module in the system, and the like are determined, the risk is calculated with higher accuracy, and the user can further grasp an appropriate countermeasure.

Example of Functional Configuration

Figure 6:
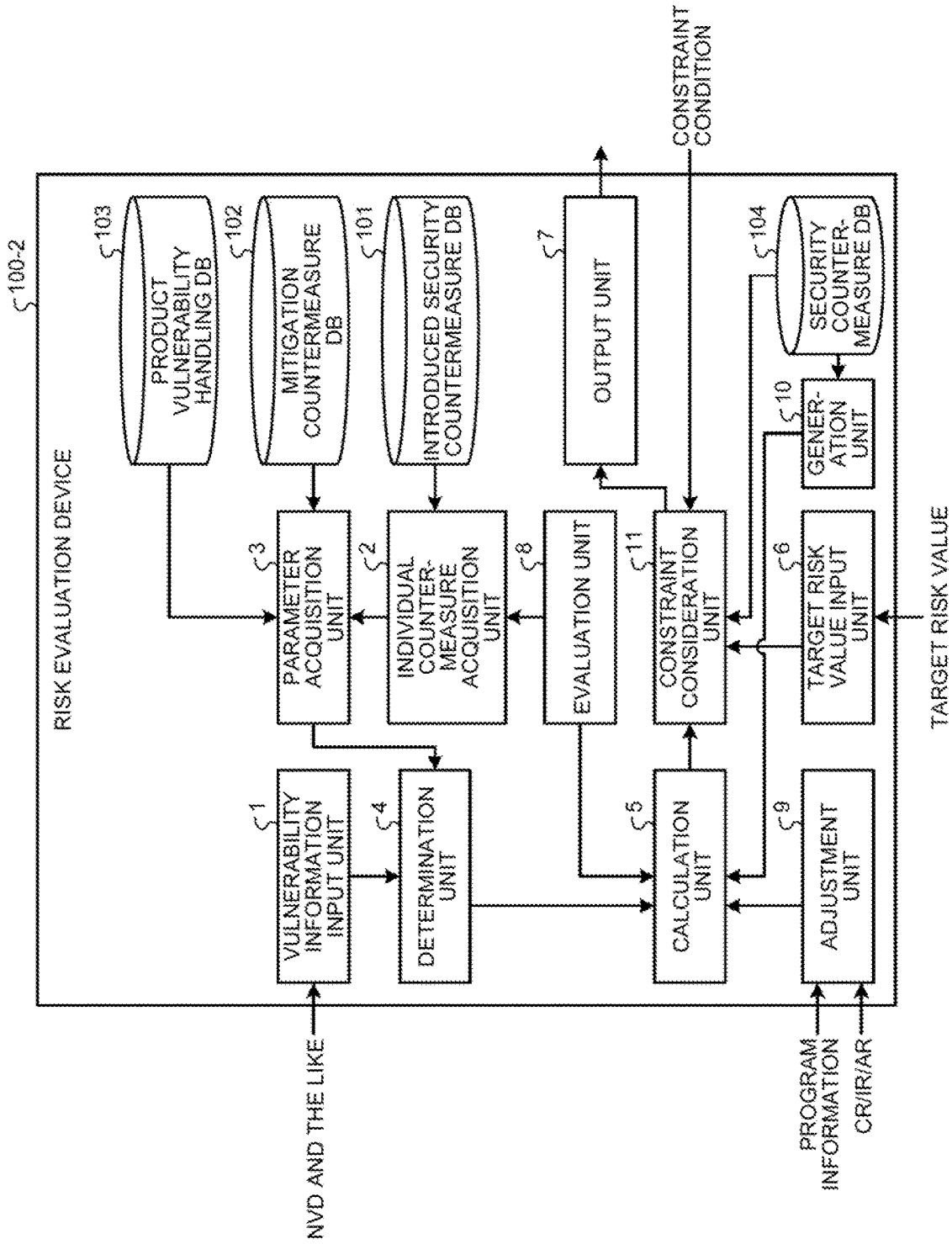
FIG. 6 is a diagram illustrating an example of a functional configuration of a risk evaluation device according to a second embodiment.

FIG. 6 is a diagram illustrating an example of a functional configuration of a risk evaluation device 100-2 according to the second embodiment. The risk evaluation device 100-2 according to the second embodiment includes the vulnerability information input unit 1, the individual countermeasure acquisition unit 2, the parameter acquisition unit 3, the determination unit 4, the calculation unit 5, the target risk value input unit 6, the output unit 7, an evaluation unit 8, an adjustment unit 9, a generation unit 10, and a constraint consideration unit 11. In addition, the risk evaluation device 100-2 according to the second embodiment stores the introduced security countermeasure DB 101, the mitigation countermeasure DB 102, the product vulnerability handling DB 103, and a security countermeasure DB 104. That is, in the risk evaluation device 100-2 according to the second embodiment, the evaluation unit 8, the adjustment unit 9, the generation unit 10, the constraint consideration unit 11, and the security countermeasure DB 104 are added.

Specifically, first, the evaluation unit 8 evaluates whether a security countermeasure introduced in consideration of a system configuration is effective for vulnerability for which a vulnerability risk is determined. As a method of evaluating whether the security countermeasure is effective, for example, a method of specifying an assumed attack source and evaluating whether the security countermeasure is effective based on whether there is a device that performs the security countermeasure in a path from the attack source to the system to be evaluated is considered. When the security countermeasure is not effective, the evaluation unit 8 changes the candidate parameter value acquired for each security countermeasure.

In addition, the evaluation unit 8 may determine that only a specific vector is valid according to the setting or the like, in addition to simple determination of the presence or absence of validity. For example, when a firewall is arranged on a path, a case where communication from the outside to the inside is blocked and communication from the inside to the outside is permitted is considered. In the mitigation countermeasure DB 102 of FIG. 3, in the parameter condition, MAV=L when AV=N, and MC=N when C=H or L, but since outward communication is permitted, the installation of the firewall does not contribute to confidentiality. Although MAV=L is established in this manner, the evaluation unit 8 may perform evaluation such that MC is maintained at H or L. That is, the evaluation unit 8 may further evaluate whether the security countermeasure is valid from the setting of the device when there is the device that performs the security countermeasure on the path, and may change (in the above example, MC=N is changed to MC=H or L) the candidate parameter value acquired for each security countermeasure when the security countermeasure is not effective.

The adjustment unit 9 adjusts the security requirement degree from program information of the program operating in the system to be evaluated and a predetermined adjustment rule. For example, the adjustment unit 9 performs adjustment on a vector relating to the security requirement degree (CR/IR/AR) input by the user by using the program information and the adjustment rule.

For example, the program information includes an operation time of the program. In this case, the adjustment rule is, for example, a rule for adjusting the security requirement degree according to the operation time. In addition, for example, the program information includes a usage status of a library linked to the program. In this case, the adjustment rule is, for example, a rule for adjusting the security requirement degree according to the usage status of the library, and for example, the program information includes information indicating whether the program performs network communication. In this case, the adjustment rule is, for example, a rule for adjusting the security requirement degree according to the presence or absence of network communication.

FIG. 7 is a diagram illustrating an example of an adjustment rule according to the second embodiment. For example, the adjustment unit 9 adjusts the vector relating to the security requirement degree (CR/IR/AR) from the program information with reference to the adjustment rule illustrated in FIG. 7.

For example, when the program information includes operation history information of a process or a library, the adjustment rule includes a rule of calculating an operation time rate of the process or the library with respect to an operation time of the system (for example, unit time such as one hour and one day) and decreasing the value of CR/IR/AR as the operation time rate is smaller. Furthermore, for example, when the program information includes the presence or absence of communication via the network of the process, the adjustment rule includes a rule for lowering the value of CR/IR/AR by one stage if there is no communication via the network. Furthermore, for example, when the program information includes link information indicating a state of a link from the program for the library, the adjustment rule includes a rule of lowering the value of CR/IR/AR by two stages if not linked from the program.

Referring back to FIG. 6, the generation unit 10 refers to the security countermeasure DB 104 and generates a combination of security countermeasures that is not introduced in the system to be subjected to risk evaluation.

FIG. 8 is a diagram illustrating an example of the security countermeasure DB 104 according to the second embodiment. For example, it is assumed that the security countermeasures that are not introduced to the system to be subjected to risk evaluation are a firewall, an IPS, and a rejection list type execution control. In this case, the generation unit 10 generates seven types of combinations of only the firewalls, only the IPSs, only the rejection list type execution control, the firewall+IPS, the firewall+rejection list type execution control, the IPS+rejection list type execution control, and the firewall+IPS+rejection list type execution control.

Referring back to FIG. 6, the calculation unit 5 of the second embodiment further has a function of calculating the environmental value (risk value) on the assumption that the combination of the security countermeasures generated by the generation unit 10 is further introduced. As a method of calculating the environmental value, as described in the first embodiment, a method of determining an environmental value calculation vector when each security countermeasure is introduced and calculating the environmental value based on the environmental value calculation vector may be used.

The constraint consideration unit 11 determines whether a constraint condition can be satisfied when an unintroduced security countermeasure is newly introduced and prioritizes introduction of the security countermeasure. For example, the constraint consideration unit 11 uses the information in the security countermeasure DB 104 to prioritize the introduction of the security countermeasures.

For example, it is assumed that there is a constraint that "a security countermeasure affecting network latency is not introduced" as the constraint condition. The constraint consideration unit 11 refers to the security countermeasure DB 104 in FIG. 8 and specifies that the security countermeasure affecting the network latency is a firewall. Therefore, the constraint consideration unit 11 lowers the priority of the combination of security countermeasures including the firewall. Further, when a combination of the unintroduced security countermeasures is introduced from the target risk value input unit 6, the constraint consideration unit 11 obtains information indicating whether the security countermeasure falls below the target risk value and finally determines the priority of the security countermeasure. That is, the constraint consideration unit 11 determines the security countermeasure that falls below the target risk value and satisfies the constraint condition as the security countermeasure to be output.

In addition to the function of the output unit 7 of the first embodiment, the output unit 7 of the second embodiment further has a function of outputting a combination of security countermeasures (one or more security countermeasures) obtained from the constraint consideration unit 11 and the priority thereof. At this time, the output unit 7 may output the output information further including a constraint caused by introducing the security countermeasure determined by the constraint consideration unit 11 and a change in the environmental value.

Figure 9:
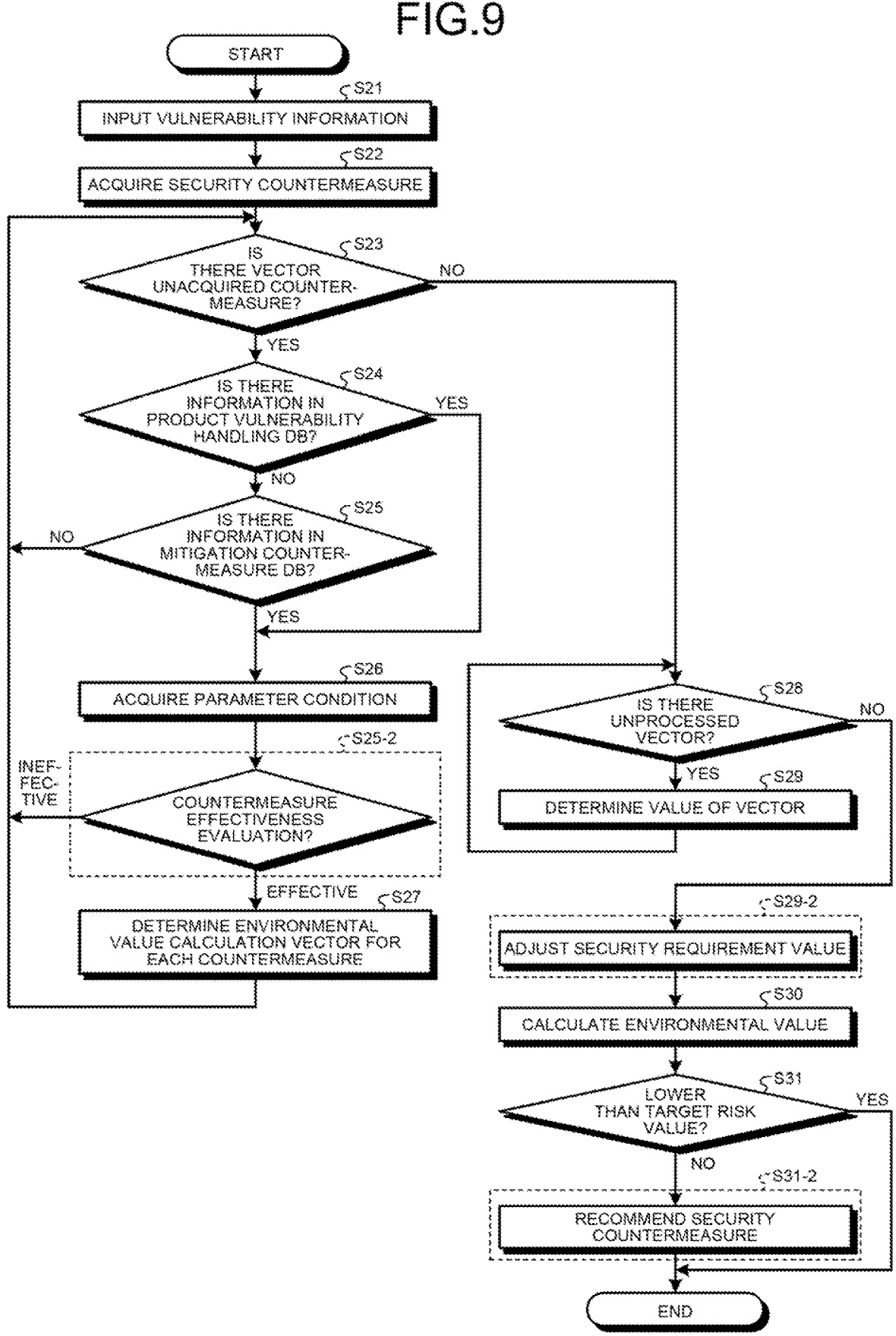
FIG. 9 is a flowchart illustrating an example of a risk evaluation method according to the second embodiment.
Figure 11:
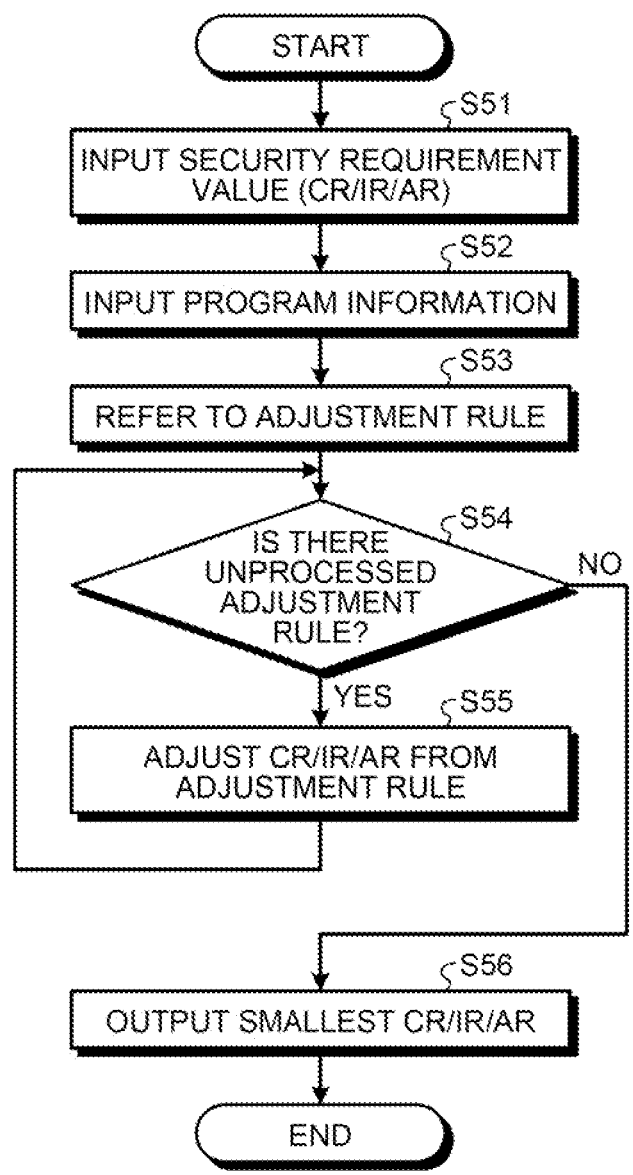
FIG. 11 is a flowchart illustrating an example of a security requirement value adjustment process (Step S29-2) according to the second embodiment.
Figure 12:
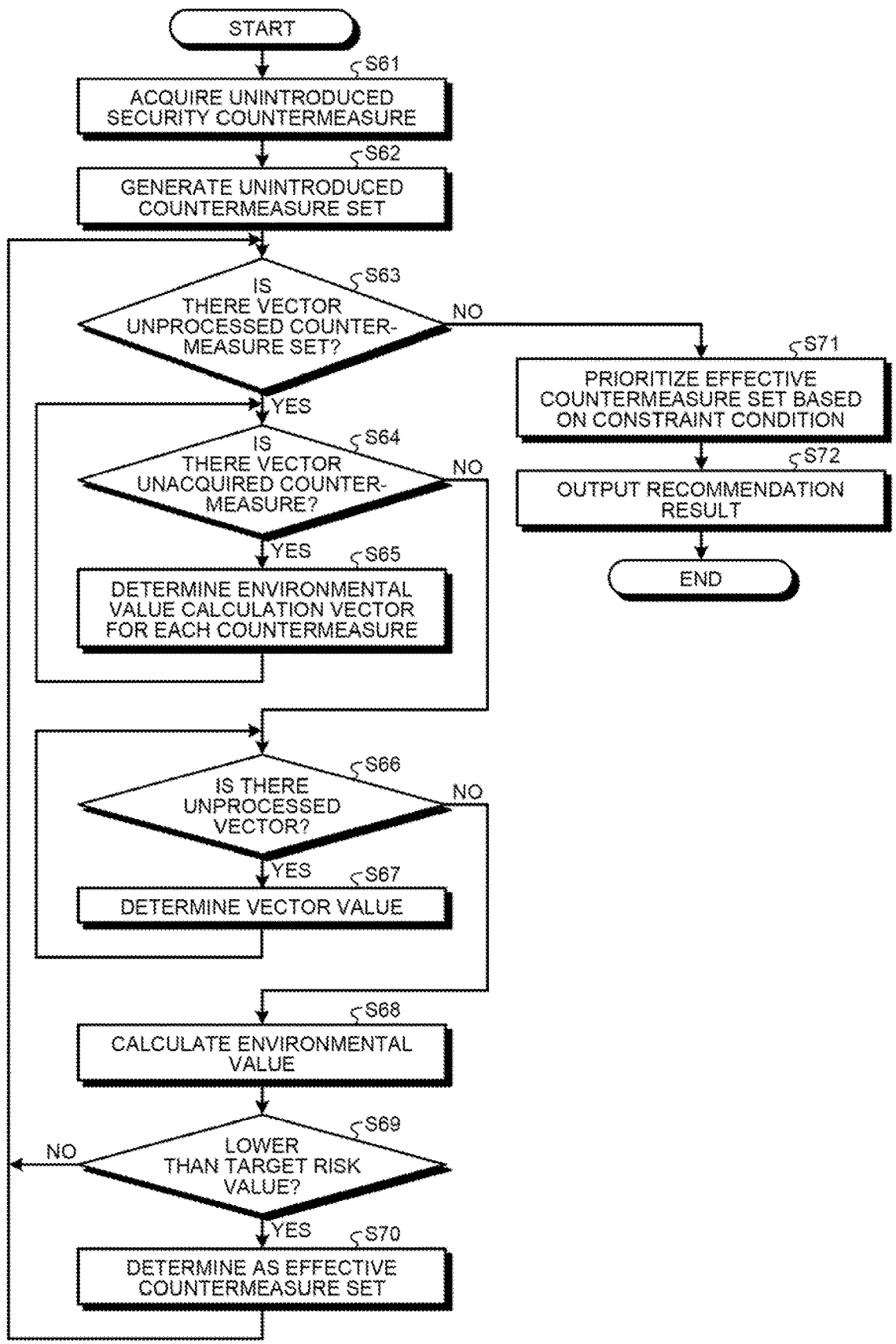
FIG. 12 is a flowchart illustrating an example of a security countermeasure recommendation process (Step S31-2) according to the second embodiment.

FIG. 9 is a flowchart illustrating an example of a risk evaluation method according to the second embodiment Steps S21 to S31-2). There are three main differences from the risk evaluation method of the first embodiment: a countermeasure effectiveness evaluation process (Step S25-2), a security requirement value adjustment process (Step S29-2), and a security countermeasure recommendation process (Step S31-2). Flowcharts of the processes are as illustrated in FIGS. 10 to 12.

Figure 10:
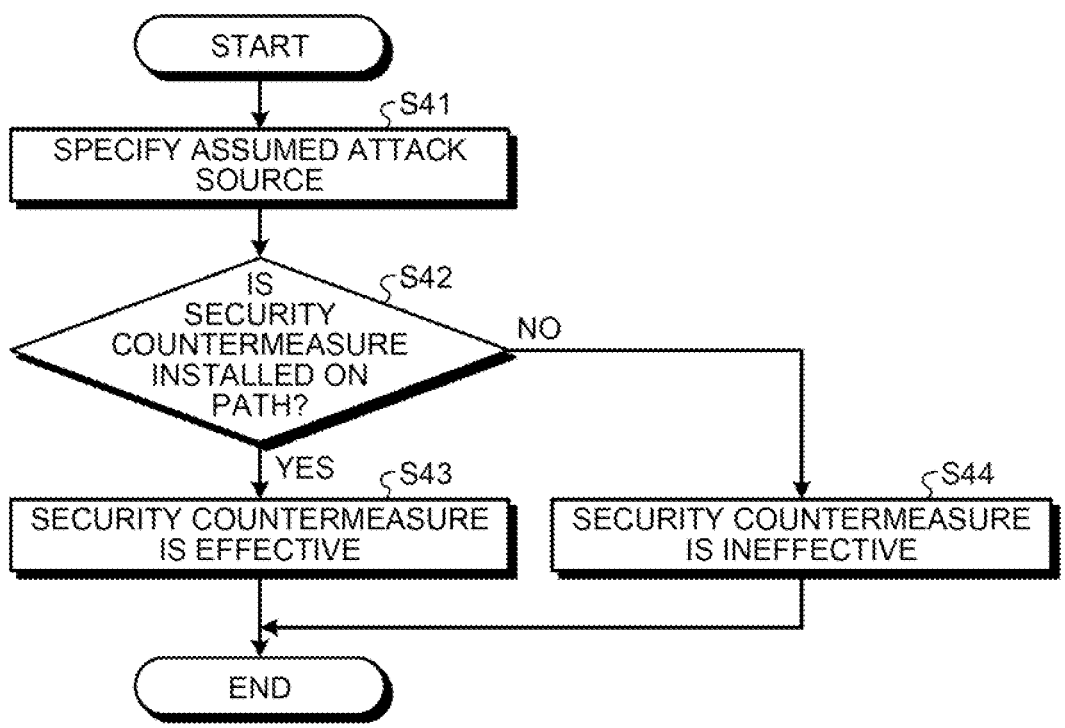
FIG. 10 is a flowchart illustrating an example of a countermeasure effectiveness evaluation process of (Step S25-2) according to the second embodiment.

FIG. 10 is a flowchart illustrating an example of a countermeasure effectiveness evaluation process (Step S25-2) according to the second embodiment. First, the evaluation unit 8 specifies an assumed attack source (Step S41). A method of specifying the assumed attack source may be any method. For example, the evaluation unit 8 receives input information indicating the assumed attack source from the user and specifies the assumed attack source from the corresponding input information.

Next, the evaluation unit 8 checks whether a security countermeasure is installed on the path (Step S42). When the security countermeasure is installed on the path (Step S42, Yes), the evaluation unit 8 evaluates that the security countermeasure is effective and determines a valid environmental value calculation vector (Step S43).

On the other hand, when the security countermeasure is not installed on the path (Step S42, No), the evaluation unit 8 evaluates that the security countermeasure is ineffective (Step S44). For example, when a firewall that does not block communication from the inside to the outside is installed on the path, the evaluation unit 8 evaluates that the confidentiality (MC) does not change (is not effective) with this firewall.

FIG. 11 is a flowchart illustrating an example of a security requirement value adjustment process (Step S29-2) according to the second embodiment. First, the adjustment unit 9 receives an input of the security requirement value (CR/IR/AR) (Step S51). Note that the security requirement value (CR/IR/AR) is similar to that of the first embodiment, and thus description thereof is omitted.

Next, the adjustment unit 9 receives the input of the program information described above (Step S52). Next, the adjustment unit 9 determines whether there is an unprocessed rule (Step S54), for example, by referring to the adjustment rule as illustrated in FIG. 7 (Step S53). When there is an unprocessed adjustment rule (Step S54, Yes), the adjustment unit 9 adjusts the CR/IR/AR input in Step S51 from the corresponding adjustment rule and the program information input by the process in Step S52 (Step S55).

On the other hand, when there is not an unprocessed adjustment rule (Step S54, No), the adjustment unit 9 selects the smallest CR/IR/AR for each of the CR/IR/AR obtained by the processes up to Step S55 and outputs the selected CR/IR/AR (Step S56).

Note that, in the example of the flowchart in FIG. 11, the adjustment unit 9 independently adjusts the CR/IR/AR in each adjustment rule and then selects the minimum CR/IR/AR, but the CR/IR/AR may not be independently adjusted in each adjustment rule. For example, the adjustment unit 9 may obtain a value obtained by adjusting the CR/IR/AR in the process of Rule Number 1 and further adjust (update) the CR/IR/AR by using the CR/IR/AR adjusted in Rule Number 1 in the process of Rule Number 2.

FIG. 12 is a flowchart illustrating an example of a security countermeasure recommendation process (Step S31-2) according to the second embodiment.

Figure 13:
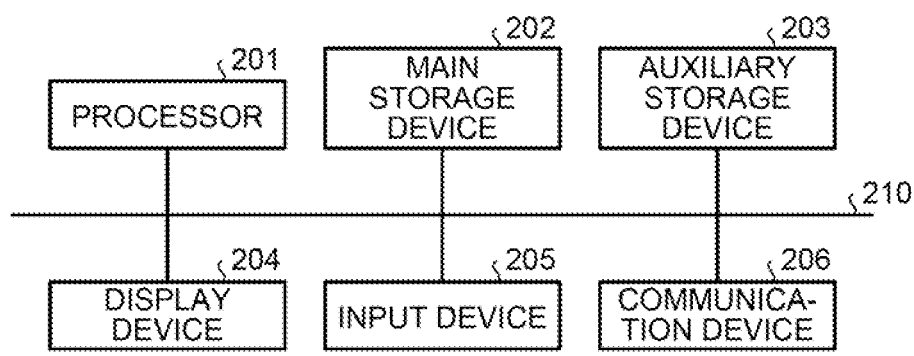
FIG. 13 is a diagram illustrating an example of a hardware configuration of the risk evaluation device according to the first and second embodiments.

FIG. 13 is a flow of countermeasure recommendation in S3. First, the generation unit 10 acquires a security countermeasure (unintroduced countermeasure) that is not introduced in the system to be subjected to risk evaluation with reference to the security countermeasure DB 104 (Step S61) and generates a combination (countermeasure set) of the unintroduced countermeasures (Step S62).

Next, the determination unit 4 determines whether there is a countermeasure set of which a vector is not processed for each countermeasure set generated by the process in Step S62 (Step S63). If there is a countermeasure set for which a vector is not calculated (Step S63, Yes), the parameter acquisition unit 3 determines whether there is a countermeasure of which a vector is not acquired among the countermeasures included in the countermeasure set of which vectors are not calculated (Step S64).

If there is a countermeasure of which a vector is not acquired (Step S64, Yes), the parameter acquisition unit 3 determines an environmental value calculation vector for each security countermeasure (Step S65). Note that the detailed processes from Step S64 to Step S65 are similar to the processes of Steps S3 to S7 of the first embodiment.

When there is no countermeasure of which the vector is not acquired (Step S64, No), the determination unit 4 determines the value of the environmental value calculation vector for each vector (Steps S66 and S67). For example, the determination unit 4 determines the value of the vector having the lowest risk among the vectors of one or more countermeasures as the environmental value calculation vector.

When there is not an unprocessed vector (Step S66, No), the calculation unit 5 calculates the environmental value by using the environmental value calculation vector (Step S68).

Next, the target risk value input unit 6 determines whether the environmental value calculated by the process in Step S68 is lower than the target risk value (Step S69). If the environmental value is lower than the target risk value (Step S69, Yes), the target risk value input unit 6 determines this countermeasure set as an effective countermeasure set (Step S70), and the process returns to Step S63.

On the other hand, if the risk is higher than the target risk value (Step S69, No), the process returns to Step S63.

When the processes of Steps S63 to S70 are repeated and there is no countermeasure set of which vectors are not processed (Step S63, No), the constraint consideration unit 11 prioritizes the effective countermeasure set determined in Step S70 based on the constraint condition described above and the information in the security countermeasure DB 104 of FIG. 8 (Step S71) and outputs the result as a recommendation result (Step S72).

As described above, with the risk evaluation device 100-2 of the second embodiment, it is possible to calculate the risk with higher accuracy and also recommend an appropriate countermeasure in consideration of the effectiveness of the security countermeasure, the method of using the module in the system (constraint condition), and the like.

Finally, an example of a hardware configuration of the risk evaluation device 100 (100-2) according to the first and second embodiments is described. The risk evaluation device 100 (100-2) according to the first and second embodiments can be implemented, for example, by using any computer device as basic hardware.

Example of Hardware Configuration

FIG. 13 is a diagram illustrating an example of a hardware configuration of the risk evaluation device 100 (100-2) according to the first and second embodiments. The risk evaluation device 100 (100-2) according to the first and second embodiments includes a processor 201, a main storage device 202, an auxiliary storage device 203, a display device 204, an input device 205, and a communication device 206. The processor 201, the main storage device 202, the auxiliary storage device 203, the display device 204, the input device 205, and the communication device 206 are connected to each other via a bus 210.

Note that the risk evaluation device 100 (100-2) may not include a part of the above configuration. For example, when the risk evaluation device 100 (100-2) can use an input function and a display function of an external device, the display device 204 and the input device 205 may not be included in the risk evaluation device 100 (100-2).

The processor 201 executes a program read from the auxiliary storage device 203 to the main storage device 202. The main storage device 202 is a memory such as a ROM and a RAM. The auxiliary storage device 203 is a hard disk drive (HDD), a memory card, or the like.

The display device 204 is, for example, a liquid crystal display or the like. The input device 205 is an interface for operating the risk evaluation device 100 (100-2). Note that the display device 204 and the input device 205 may be implemented by a touch panel or the like having a display function and an input function. The communication device 206 is an interface for communicating with other devices.

For example, the program executed by the risk evaluation device 100 (100-2) is a file in an installable format or an executable format, is recorded in a computer-readable storage medium such as a memory card, a hard disk, a CD-RW, a CD-ROM, a CD-R, a DVD-RAM, and a DVD-R, and is provided as a computer program product.

Furthermore, for example, the program executed by the risk evaluation device 100 (100-2) may be stored on a computer connected to a network such as the Internet and provided by being downloaded via the network.

Furthermore, for example, the program executed by the risk evaluation device 100 (100-2) may be provided via a network such as the Internet without being downloaded. Specifically, for example, the risk evaluation process may be executed by an application service provider (ASP) type cloud service.

Furthermore, for example, the program of the risk evaluation device 100 (100-2) may be provided by being incorporated in advance in a ROM or the like.

The program executed by the risk evaluation device 100 (100-2) has a module configuration including functions that can be implemented by the program among the functional configurations described above. As actual hardware, the corresponding functions are implemented by the processor 201 reading a program from a storage medium and executing the program, and the functional blocks are loaded on the main storage device 202. That is, the functional blocks are generated on the main storage device 202.

Note that some or all of the functions described above may be implemented by hardware such as an integrated circuit (IC) without being implemented by software.

In addition, each function may be implemented by using the plurality of processors 201, and in this case, the processors 201 each may implement one of the functions or may implement two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A risk evaluation device, comprising:
one or more hardware processors configured to function as:
a vulnerability information input unit configured to receive an input of vulnerability information to be subjected to risk evaluation;
an individual countermeasure acquisition unit configured to acquire at least one security countermeasure introduced into a system to be evaluated;
a parameter acquisition unit configured to acquire a candidate parameter value to be used for calculation of a risk of vulnerability for each of security countermeasures based on the security countermeasure and the vulnerability information;
a determination unit configured to determine a parameter to be used for the calculation of the risk of vulnerability from candidate parameter values; and
a calculation unit configured to calculate a risk value indicating the risk of vulnerability by using the parameter determined by the determination unit.

2. The risk evaluation device according to claim 1, wherein the vulnerability information is common vulnerabilities and exposures (CVE).

3. The risk evaluation device according to claim 1, wherein the one or more hardware processors are configured to further function as:
a target risk value input unit configured to receive an input of a target risk value and determine a risk value higher than the target risk value as a risk value to be output; and
an output unit configured to output the risk value to be output.

4. The risk evaluation device according to claim 1, wherein the parameter acquisition unit acquires, for each security product introduced into the system to be evaluated, the c parameter value further based on the type of vulnerability when the type of vulnerability that is handleable by the security product can be acquired.

5. The risk evaluation device according to claim 1, wherein the one or more hardware processors are configured to further function as:
an evaluation unit configured to specify an assumed attack source, evaluate whether the security countermeasure is effective based on whether there is a device that performs the security countermeasure on a path from the attack source to the system to be evaluated, and change the candidate parameter value acquired for each of the security countermeasures when the security countermeasure is not effective.

6. The risk evaluation device according to claim 5, wherein, when there is a device that performs the security countermeasure on the path, the evaluation unit further evaluates whether the security countermeasure is effective from a setting of the device and changes the candidate parameter value acquired for each of the security countermeasures when the security countermeasure is not effective.

7. The risk evaluation device according to claim 1, wherein the calculation unit further receives an input of a security requirement degree of the system to be evaluated and calculates the risk value based on the security requirement degree.

8. The risk evaluation device according to claim 7, wherein the one or more hardware processors are configured to further function as:
 an adjustment unit configured to adjust the security requirement degree from program information of a program operating in the system to be evaluated and a predetermined adjustment rule.

9. The risk evaluation device according to claim 8, wherein
 the program information includes an operation time of the program, and
 the adjustment rule is a rule for adjusting the security requirement degree according to the operation time.

10. The risk evaluation device according to claim 8, wherein
 the program information includes a usage status of a library linked to the program, and
 the adjustment rule is a rule for adjusting the security requirement degree according to the usage status.

11. The risk evaluation device according to claim 8, wherein
 the program information includes information indicating whether the program performs network communication, and
 the adjustment rule is a rule for adjusting the security requirement degree according to presence or absence of the network communication.

12. The risk evaluation device according to claim 1, wherein the one or more hardware processors are configured to further function as:
 a generation unit configured to generate a combination of unintroduced security countermeasures into the system to be evaluated, wherein
 the calculation unit further calculates a risk value when the combination of the unintroduced security countermeasures is introduced.

13. The risk evaluation device according to claim 12, wherein the one or more hardware processors are configured to further function as:
 a constraint consideration unit configured to give a priority to a combination of the unintroduced security countermeasures from a constraint condition when the combination of the unintroduced security countermeasures is introduced; and
 an output unit configured to output the combination of the unintroduced security countermeasures and the priority.

14. A risk evaluation method implemented by a computer, the method comprising:
 receiving, by the risk evaluation device, an input of vulnerability information to be subjected to risk evaluation;
 acquiring, by the risk evaluation device, at least one security countermeasure introduced into a system to be evaluated;
 acquiring, by the risk evaluation device, a candidate parameter value to be used for calculation of a risk of vulnerability for each of security countermeasures based on the security countermeasure and the vulnerability information;
 determining, by the risk evaluation device, a parameter to be used for the calculation of the risk of vulnerability from candidate parameter values; and
 calculating, by the risk evaluation device, a risk value indicating the risk of vulnerability by using the determined parameter.

15. A computer program product having a non-transitory computer readable medium including programmed instructions stored thereon, wherein the instructions, when executed by a computer, cause the computer to function as:
 a vulnerability information input unit configured to receive an input of vulnerability information to be subjected to risk evaluation;
 an individual countermeasure acquisition unit configured to acquire at least one security countermeasure introduced into a system to be evaluated;
 a parameter acquisition unit configured to acquire a candidate parameter value to be used for calculation of a risk of vulnerability for each of security countermeasures based on the security countermeasure and the vulnerability information;
 a determination unit configured to determine a parameter to be used for the calculation of the risk of vulnerability from candidate parameter values; and
 a calculation unit configured to calculate a risk value indicating the risk of vulnerability by using the parameter determined by the determination unit.

* * * * *